United States Patent

Zeuner

[15] 3,695,293
[45] Oct. 3, 1972

[54] PRESSURE DIVERTING VALVE ASSEMBLY

[72] Inventor: Kenneth W. Zeuner, Newtown, Pa.

[73] Assignee: Control Concepts, Inc., Pike Richboro, Pa.

[22] Filed: Sept. 9, 1970

[21] Appl. No.: 70,232

[52] U.S. Cl. .................................137/625.48
[51] Int. Cl. ..................................F16k 11/02
[58] Field of Search.......137/625.48, 625.46, 625.47, 137/625.41, 625.42, 614.17; 251/282

[56] References Cited

UNITED STATES PATENTS

| | | |
|---|---|---|
| 3,530,895 | 9/1970 | Rothrock...............251/282 X |
| 2,196,664 | 4/1940 | Kofahl..................137/625.48 |
| 2,785,699 | 3/1957 | Creson et al......137/625.48 X |
| 2,791,236 | 5/1957 | Mauer ..............137/614.17 X |
| 2,910,091 | 10/1959 | Weis.....................137/625.48 |
| 2,989,988 | 6/1961 | Rudelick...........137/625.48 X |
| 3,308,851 | 3/1967 | Zoludow...............137/625.48 |
| 3,358,964 | 12/1967 | Cohen et al............251/282 X |
| 3,457,957 | 7/1969 | Mueller ................251/282 X |

*Primary Examiner*—Samuel Scott
*Attorney*—Maleson, Kimmelman and Ratner and Allan Ratner

[57] ABSTRACT

A pressure diverting valve assembly permitting fluid flow through the assembly during operation and to reduce pressure surges which may occur within inlet and outlet lines. A centrally bored valve element in the assembly has a valve seat which closes the centrally bored opening when the assembly is actuated. When the assembly is deactuated the valve element moves forward releasing the valve seat from the opening. Movement of the poppet valve provides equal fluid volume changes on opposing ends of the valve element resulting in fluid flow diversion from one set of ports to another within the valve assembly with a resulting minimum pressure surge through the lines.

7 Claims, 5 Drawing Figures

PATENTED OCT 3 1972           3,695,293
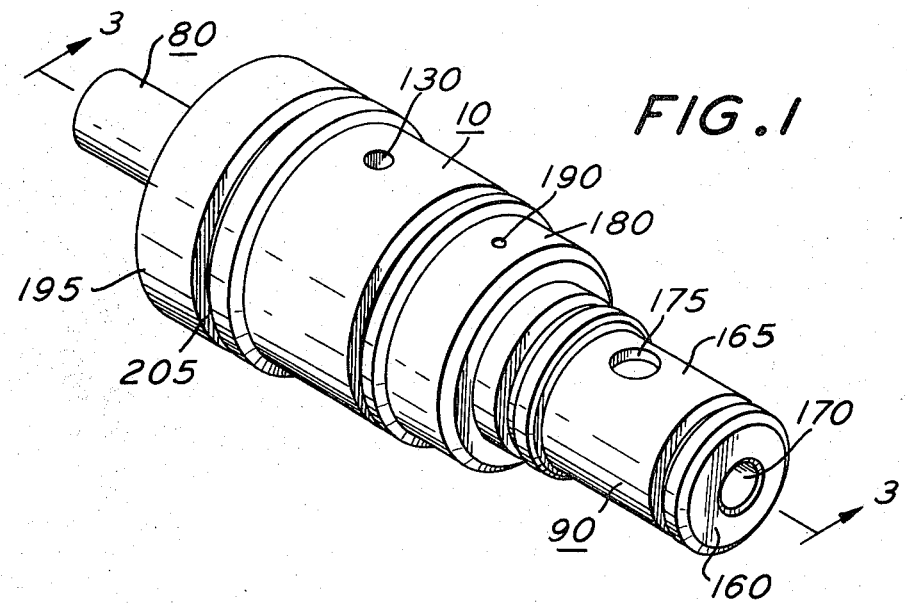
FIG. 1
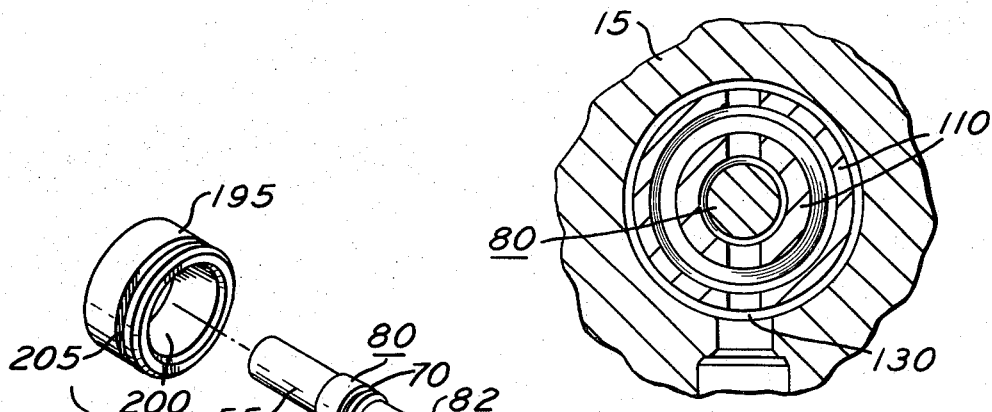
FIG. 2
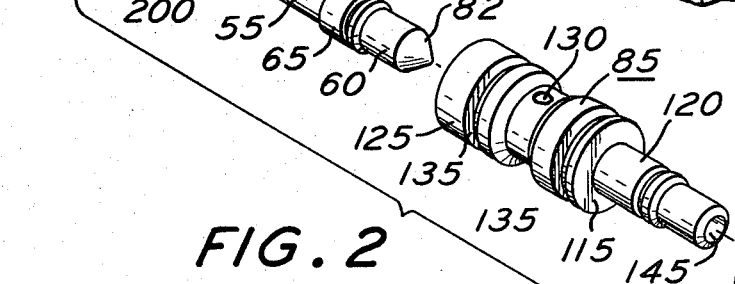
FIG. 5
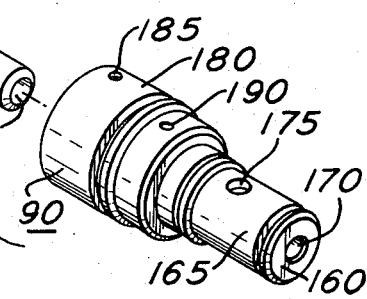
INVENTOR
KENNETH W. ZEUNER
BY
Maleson, Kimmelman & Ratner
ATTORNEYS INVENTOR
KENNETH W. ZEUNER
BY
Maleson, Kimmelman & Ratner

ATTORNEYS

3,695,293

PRESSURE DIVERTING VALVE ASSEMBLY

BACKGROUND OF THE INVENTION

1. Field of the Invention

This invention relates to the field of poppet valves which allow for fluid flow to be diverted through the valve.

2. Prior Art

Valve assemblies and in particular, poppet valves allow fluid to pass through while in operation and close various inlet and outlet ports upon pressure deactuation. However, such prior poppet valves have had a solid central core. When such a valve is actuated to a closed position, there is a considerable volume of fluid trapped between the solid central core poppet and the seat which would be displaced in the case of an incompressible fluid or compressed in the case of a compressible fluid system. In both cases of either a compressible or incompressible fluid, a displacement of the volume of fluid causes a pumping action since there is an increase of pressure over a short period of time. That increase of pressure travels through the path of least resistance passing into the inlet or outlet lines and sent throughout the system. Where a system is being tested such a pressure surge may have adverse effects on measurements being taken. Where the system is in operation and is active, various elements may be damaged due to the pressure surges or pulses, such elements including pressure gauges, inlet and outlet lines, and possibly even to the extent of the valve system itself.

SUMMARY OF THE INVENTION

A pressure diverting valve assembly which is actuatable to a first state for permitting fluid flow from a first port to a second port, and to a second state for permitting fluid flow between a first port and a third port. A valve element slidably moves within a housing having formed therein the first, second and third ports. The valve element has a central cavity in fluid connection with the first port with a first valve seat to engage the perimeter of the cavity at a first end of the valve element and a second valve seat to engage a third port in the housing at a second end of the valve element. The valve element is actuated to the first state for engaging the second valve seat with the third port for fluid flow between the first and second parts. The valve element is actuated to the second state for engaging the first valve element end to the first valve seat for fluid flow between the first and third ports. In this manner a change in operation from one state to another does not introduce pressure surges occurring within the lines of the system.

BRIEF DESCRIPTION OF THE DRAWINGS

FIG. 1 is an isometric view of the valve assembly;

FIG. 2 is an exploded view of the valve assembly elements of the assembly of FIG. 1;

Figure 3:
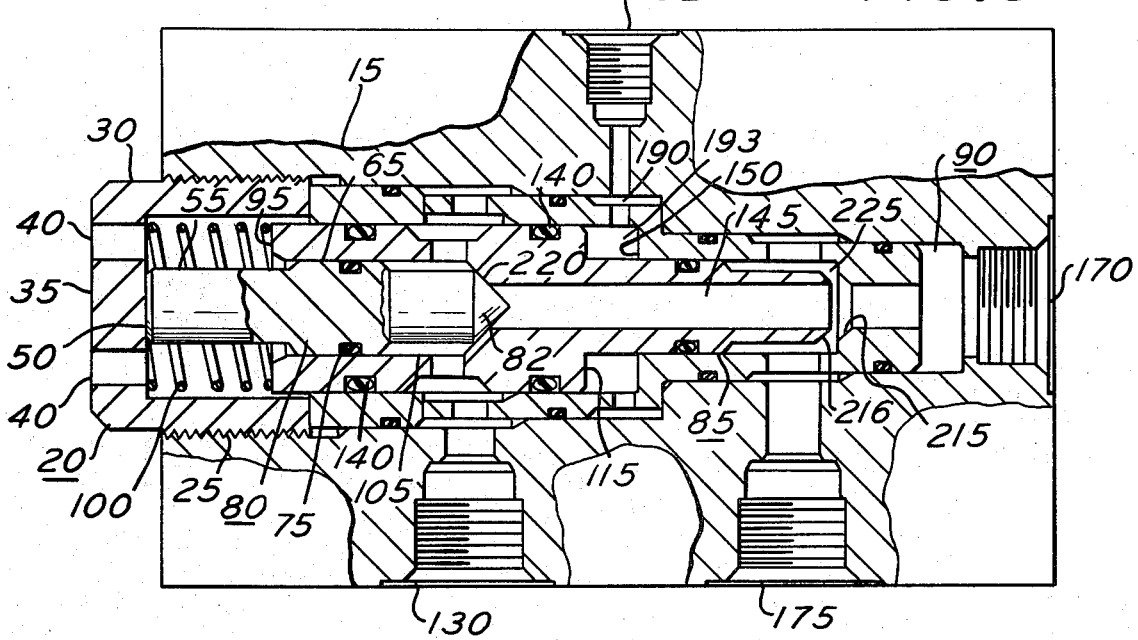
FIG. 3 is a cross-section of the valve assembly of FIG. 1 in operation with the valve element in a contact position with the floating seat defining a second state of valve assembly operation with fluid flowing between a first and third part.

Referring to the drawings, valve assembly 10 is secured to frame 15 by end cap 20 connecting mechanism. End cap 20 engages frame 15 by means of mating threads 25 or some other connecting device such as bolts not important to the invention. End cap 20 is generally cup shaped in nature, being machined such that end cap lateral walls 30 contact frame 15. End cap base surface 35 has vents 40 extending through the end cap base surface 35 in order to prevent fluid back pressure from building up. In this manner, end cap 20 holds valve assembly 10 in place within frame 15 and further provides an escape for any fluid pressure which may be building to an unacceptable level.

A first valve seat 80 is slideably moveable within valve assembly 10, not being rigidly secured to end cap base surface 35. However, first valve seat base 50 is kept in contact with end cap 20 due to fluid pressure acting on first valve seat 80 and holding first valve seat base 50 in contact with end cap base surface 35. First valve seat 80 is generally cylindrical in nature having lateral surface 55 and forward lateral surface 60 machined to the same diameter. At approximately the center of the lateral length of first valve seat 80 there is formed shoulder surface 65 which is machined in excess of the diameter of lateral surface 55 and forward lateral surface 60. Shoulder surface 65 provides contact between first valve seat 80 and valve assembly 10, thus allowing free slideable movement of first valve seat 80. Within shoulder surface 65 floating seat slot 70 is machined within which is fitted floating seat "O" rings 75. Floating seat "O" rings 75 provide a fluid seal for first valve seat 80. Forward lateral surface 60 terminates in conical end 82 formed in a one piece construction in the manner of a conical head.

Valve element 85 is slideably moveable within housing 90. Valve element 85 is cylindrically machined with varying surface diameters to provide proper contact between moveable valve element 85 and housing 90. Base surface 95 is contacted by spring 100. Spring 100 is compressibly forced against end cap base surface 35, and provides compressive stress to valve element 85. Shoulder surface 65 of first valve seat 80 contacts inner surface 105 of valve element 85 to provide a track within which valve element 85 may moveably slide with respect to first valve seat 80. Inner surface 105 is substantially the same diameter as shoulder surface 65 necking down to a smaller diameter central cavity 145 which extends through the remaining length of valve element 85. The combination of inner surface 105 and central cavity 145 therefore provide a continuous opening throughout the entire length of valve element 85. Conical end 82 is of sufficient diameter at its base to effectively block the entire diameter of central cavity 145. A second end valve element 216 is formed as a truncated cone on the outer surface of central cavity 145 and slideably moves within housing 90 in response to fluid pressure applied through pilot port 190.

Shoulder 115 is machined in valve element 85 to provide essentially two surfaces of different diameters.

Forward cylinder 120 moves within housing 90 in free linear motion until contacted by shoulder 115 against a shoulder provided in housing 90. Rear cylinder 125 is substantially the same diameter as inner surface of housing 90 thereby providing moveable contact in translation between valve element 85 and housing 90. A second port 130 extends through the wall of rear cylinder 125. During operation of valve assembly 10 in the second state valve element 85 is forced in a rearward direction thereby contacting first valve seat 80 on conical end 82 with the perimeter of central cavity 145. Contact between the surfaces effectively blocks fluid flow through second port 130. During operation in a first state, valve element 85 slideably moves to allow a relative translation between first valve seat 80 and inner surface 105 in a direction releasing the blockage of second port 130. Rear cylinder slots 135 extending around the periphery of rear cylinder 125 are machined in order to provide a seat for rear cylinder "O" rings 140 to seal valve element 85 from fluid pressure leaks.

Housing 90 generally cylindrical in nature is machined from steel or corresponding material which will provide minimum corrosion from the specific fluid being used. Central bore 110 extends throughout the lateral length of housing 90. Central bore 110 is machined throughout the lateral length of housing 90 and is essentially a two diameter surface, corresponding to and substantially the same diameter as rear cylinder 125 and forward cylinder 120 on valve element 85. Valve element 85 translates in one degree of freedom motion within housing 90 being constrained in its forward motion by contact between shoulder 115 and housing shoulder 150. Forward housing cylinder 165 within which forward cylinder 120 slideably moves has a first port 170 drilled through housing head base end 160. A third port 175 extends through forward housing cylinder 165, basically orthogonal to access of first port 170. Positioning of ports 170 and 175 on housing head base end 160 and forward housing cylinder 165 not critical to the invention but do provide means for which fluid may enter and exit valve assembly 10. Housing rear cylinder 180 of larger diameter than forward housing cylinder 165 is provided to allow rear cylinder 125 of valve element 85 to slideably move within it has provided a housing second fluid port 185 extending through housing rear cylinder 180. Housing second fluid port 185 is axially aligned with second port 130 to provide an opening wherein fluid may flow from valve assembly 10 when fluid pressure through pilot port 190 into pilot port cavity 193 is reduced causing a change in operation from a second to a first state of valve assembly 10. Pilot port 190 extends through housing rear cylinder 180 to allow fluid pressure control. Relative positioning of ports 170 and 175 as well as pilot port 190 may be changed as a function of input piping from various fluid assemblies and such will not involve the novelty, usefulness or operative characteristics of the invention.

Sleeve 195 is cylindrically formed with a central bore 200 fitting in slideable contact over rear cylinder 125 of valve element 85. Sleeve 195 contacts housing rear cylinder 180 and may be allowed to form a freely moving piece in itself. Sleeve 195 is provided as a separately moving piece of hardware as opposed to housing 90 for ease in manufacture of valve assembly 10. However, sleeve 195 may in an embodiment of valve assembly 10 be proposed as being a one piece construction inherent to the structure of housing 90. Around the periphery of sleeve 195 is provided an "O" ring slot 205 within which fits "O" ring 210 in order to provide a fluid seal for valve assembly 10.

Figure 4:
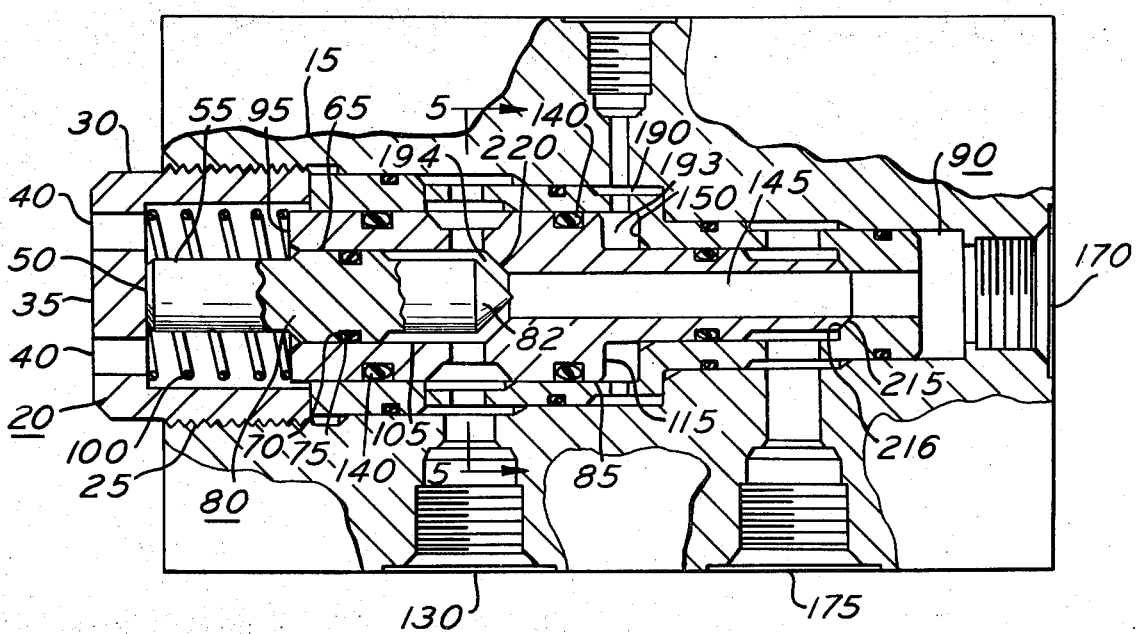
FIG. 4 is a cross-section of the valve assembly of FIG. 1 showing the valve element in contact with the second valve seat defining a first state of valve assembly operation with fluid flowing between a first and second part; and, FIG. 5 is a cross-sectional view of the floating seat in an open position.

Operation of valve assembly 10 is shown in FIGS. 3 and 4. In FIG. 3 operation of valve assembly 10 in a second state is shown wherein fluid pressure is applied through pilot port inlet 192, pilot port 190 into pilot port cavity 193. Fluid under pressure within pilot port cavity 193 exerts force in a rearward direction against shoulder 115 which in turn forces base surface 95 of valve element 85 into contact with spring 100. Conical head 82 of first valve seat 80 engages the perimeter of central cavity 145 effectively closing fluid path flow through central cavity 145. In this manner of operation, fluid is then free to enter and exit port holes 170 and 175.

FIG. 4 shows operation of valve assembly 10 in a first state wherein there is a reduction of fluid pressure being applied through pilot port inlet 192 and pilot port 190 with a corresponding decrease of pressure within pilot port cavity 193. Reduction of pilot port cavity 193 pressure allows spring 100 to compressively act against base surface 95 of valve element 85, slideably moving valve element 85 within valve assembly 10, and in particular, within housing 90. Movement of valve element 85 releases first valve seat 80 from contact with central cavity 145 thereby forming first space 194. Fluid may now flow through central cavity 145 following the path of least resistance around conical head 82 and through first space 194 passing through second port 130 and housing second fluid port 185. As will be shown in the following paragraphs, this release of fluids causes no momentary increase of pressure and corresponding danger to critical mechanisms from an increase of such pressure.

It will now be understood that where valve assembly 10 is operating in the second state as described, fluid may enter and exit from ports 170 and 175. In this manner, fluid fills central cavity 145 of valve element 85 but is not of sufficient pressure to displace first valve seat 80 from the perimeter of central cavity 145. In this second state of operation, first valve seat 80 is held in proper contact by fluid pressure applied through pilot port inlet 192, pilot port 190 and in pilot port cavity 193. Reduction of fluid pressure within pilot port cavity 193 causes a change in operation from a first to a second state wherein fluid flow changes from entrance at port 170 and exit through port 175 to a state wherein there is entrance at port 170, flow through central cavity 145 and first space 194 with exit at port 130. The reduction of fluid pressure within pilot port cavity 193 allows spring 100 to move valve element 85 in a forward direction causing a loss in contact between the perimeter of central cavity 145 and first valve seat 80. The loss of contact provides first space 194 to be formed between first valve seat 80 and valve element 85. Movement of valve element 85 causes an increase in fluid volume at first end valve element 220 represented by first space 194; in similar manner, movement of valve element 85 causes a decrease of second space 225 as second end valve element 216 moves in the direction of second valve seat 215. The increase in volume associated with first space 194 is equal to the decrease in volume of second space 225. Therefore, movement of valve element 85 avoids any net change in volume when going from a second to a first state operation mode. This then allows fluid to enter and exit ports 130, 170 and 175 with a minimum (substantially no) resultant pressure surges or pulses throughout the system.

In like manner, when pressure is applied to pilot port cavity 193 where valve assembly 10 is operational in the first state, valve element 85 moves in a rearward direction against spring 100 decreasing first space 194 by the increase in volume of second space 225 which is associated with the movement of second valve seat 215. There is no net change of fluid volume within valve assembly 10 as fluid flow is diverted from second port 130 to third port 175, once again causing a minimum (substantially no) pressure surge through system lines as operation is now converted from a second state to a first state of operation.

It will be understood that in the description of the valve assembly the word fluid is used in its generic sense such that compressible and incompressible fluids as well as gaseous systems may be used as the actuating medium.

What is claimed is:

1. A pressure damping valve assembly which is actuatable to a first state for permitting fluid flow from a first port to a second port, and to a second state for permitting fluid flow between a first port and a third port comprising:
   a. a housing having formed therein said first, second and third ports,
   b. a valve element slideable within said housing and having a central longitudinal cavity in fluid connection with said first port, the only openings to said central cavity being a first and a second end opening, said first and second end openings (1) being along the longitudinal axis of said cavity and (2) intersecting the respective ends of said cavity,
   c. a first valve seat fixed with respect to said housing for said second port to engage said valve element at said first end opening of said central cavity to close said second port,
   d. a second valve seat fixed with respect to said housing for said third port to engage said valve element at said second end opening of said central cavity to close said third port, said valve element being the only element movable with respect to said valve seats, and
   e. means for actuating said valve element external of the fluid flow between said first and second and first and third ports (1) to said first state for engaging said valve element at said second end opening with said second valve seat for first flow between said first and second ports through said central cavity and (2) to said second state for engaging said valve element at said first end opening with said first valve seat for fluid flow between said first and third ports.

2. The valve assembly of claim 1 in which said first and second seats and first and second end openings are constructed to provide a change in volume in a first space between said first seat and said first end opening substantially equal and opposite to a second space between said second seat and said second end opening as said valve element is actuated between said first and second states.

3. The valve assembly of claim 1 in which the means for actuating said valve element to a second state comprises said housing having a pressure port formed therein to supply fluid under pressure acting on said valve element to permit fluid flow between said first and third port.

4. The valve assembly of claim 3 in which the means for actuating said valve element to a first state comprises:
   a. an end cup having a base surface and lateral walls formed in one piece construction within which said first valve seat is located and in moveable contact with said base surface, and
   b. a spring member located within said end cup and in compressive contact between said end cup and said valve element.

5. A valve assembly as recited in claim 4 wherein said base surface of said end cup has vent holes passing therethrough to prevent fluid back pressure from building up.

6. A valve assembly as recited in claim 5 wherein said first valve seat is generally cylindrical in form having a conically shaped end surface to allow a varying volume of said fluid to discharge from said central cavity dependent upon said fluid pressure.

7. A valve assembly as recited in claim 6 wherein said valve element is cylindrical in construction having an opening located on the periphery to allow fluid discharge when said first valve seat conical end is removed from said central cavity.

* * * * *